(12) United States Patent
Lin et al.

(10) Patent No.: US 11,065,724 B1
(45) Date of Patent: Jul. 20, 2021

(54) LASER WELDABLE COMPOSITIONS, PRODUCTS AND USES THEREOF

(71) Applicant: CHANG CHUN PLASTICS CO., LTD., Taipei (TW)

(72) Inventors: Te-Shun Lin, Taipei (TW);
Cheng-Hsiang Hung, Taipei (TW);
Hsin-Hsien Tsai, Taipei (TW);
Po-Yuan Cheng, Taipei (TW);
Yung-Sheng Lin, Taipei (TW);
Kuen-Yuan Hwang, Taipei (TW);
June-Yen Chou, Taipei (TW)

(73) Assignee: CHANG CHUN PLASTICS CO., LTD., Taipei (TW)

( * ) Notice: Subject to any disclaimer, the term of this patent is extended or adjusted under 35 U.S.C. 154(b) by 0 days.

(21) Appl. No.: 16/853,044

(22) Filed: Apr. 20, 2020

(51) Int. Cl.
| | | |
|---|---|---|
| *B23K 35/24* | (2006.01) | |
| *C08L 67/00* | (2006.01) | |
| *C08G 63/137* | (2006.01) | |
| *C08G 63/127* | (2006.01) | |
| *C08K 3/013* | (2018.01) | |
| *B23K 103/00* | (2006.01) | |
| *B23K 26/24* | (2014.01) | |

(52) U.S. Cl.
CPC ........... *B23K 35/24* (2013.01); *B23K 26/24* (2013.01); *C08G 63/127* (2013.01); *C08G 63/137* (2013.01); *C08L 67/00* (2013.01); *B23K 2103/42* (2018.08); *C08K 3/013* (2018.01)

(58) Field of Classification Search
CPC .... C08G 63/199; C08L 67/00–08; C08K 7/20
See application file for complete search history.

(56) References Cited

U.S. PATENT DOCUMENTS

| | | | | | |
|---|---|---|---|---|---|
| 3,361,846 | A * | 1/1968 | Gleim | ............... | C08K 5/52 524/140 |
| 3,671,487 | A * | 6/1972 | Abolins | ............... | C08L 27/12 524/141 |
| 5,342,819 | A * | 8/1994 | Takiguchi | ............ | B41M 5/5272 428/412 |
| 8,735,484 | B1 * | 5/2014 | Fan | ............... | C08G 63/181 524/425 |
| 2002/0158582 | A1 * | 10/2002 | Fayt | ............... | B60R 19/445 315/77 |
| 2004/0112519 | A1 * | 6/2004 | Mori | ............... | B29C 66/9192 156/272.8 |
| 2006/0004151 | A1 * | 1/2006 | Shaikh | ............... | C08G 63/199 525/437 |
| 2011/0213056 | A1 * | 9/2011 | Hasty | ............... | C08L 67/02 524/47 |
| 2012/0149830 | A1 * | 6/2012 | Wu | ............... | C08J 5/18 524/539 |
| 2013/0321934 | A1 | 12/2013 | Minezaki et al. | | |
| 2019/0337239 | A1 | 11/2019 | Gunbas et al. | | |

FOREIGN PATENT DOCUMENTS

JP     2008106217 A     5/2008

OTHER PUBLICATIONS

Definition of alky. IUPAC Compendium of Chemical Terminology. 2014. (Year: 2014).*
Antioxidants. Polymer Properties Database. https://polymerdatabase.com/polymer%20chemistry/Antioxidants.html. As viewed on May 14, 2020. (Year: 2020).*
Extended European Search Report for EP Application No. 20175837.2, dated Sep. 8, 2020.

* cited by examiner

*Primary Examiner* — Stephen E Rieth
(74) *Attorney, Agent, or Firm* — Nixon Peabody LLP; Thomas P. Pavelko

(57) ABSTRACT

Laser weldable compositions are provided which in various examples include a tricyclodecane dimethanol-modified copolymer, a terephthalate-type polyester and an inorganic filler. Compared with compositions without the tricyclodecane dimethanol-modified copolymer, the compositions of the invention have improved, uniform laser transmittance, thereby welded products including the compositions have improved bonding strength and require stronger tensile strength to be torn apart.

18 Claims, 1 Drawing Sheet

LASER WELDABLE COMPOSITIONS, PRODUCTS AND USES THEREOF

FIELD OF INVENTION

The present disclosure relates to compositions with high and consistent laser transmissivity, and specifically polymeric laser weldable compositions and products.

BACKGROUND

Laser welding is a technique in manufacturing whereby two or more pieces of material are joined together through the use of a laser beam. Metal and thermoplastics are two common types of material used in laser welding. Laser welding requires access to the weld zone from one side of the parts being welded, and the weld is formed as intense laser light rapidly heats the material. The beam of laser—light amplification by stimulated emission of radiation—is a single-phase light of a single wavelength with a low beam divergence and high energy content and thus will create heat when it strikes a surface. Therefore, laser welding allows for precise control of the welding area, aesthetically pleasing welding seams, and practically no damage to surrounding materials or sensitive electronics while no particulates are generated in the process.

When plastic is being bonded using laser radiation, a focused laser beam passes through an upper, laser transmissive part to the interface of the two parts to be joined, and the laser light is turned into thermal energy as it is absorbed by the lower joining partner and some of the thermal energy is transferred to the upper layer in order for melting to occur in both parts. The heat created at the interface creates a molten weld seam and the two plastics are fused.

Approaches to improving the transmittance of laser weldable materials include the additions of amorphous sections and nucleating agents in order to reduce scattering of laser beam. However, achieving high transmittance, therefore high bonding strength of the welded parts, while achieving uniformity of laser transmittance of the plastics has been challenging.

SUMMARY

It is an objective of the present invention to provide new compositions which are laser weldable or laser transmissive. It is another objective of the present invention to provide new laser weldable compositions with improved, uniform laser transmittance and which affords strong welding strength. It is yet another objective of the present invention to provide laser welded products prepared from these compositions and uses thereof.

Compositions are provided, which have improved, uniform laser transmissivity for a molded product prepared with the compositions, and the compositions include (1) one or more inorganic fillers, (2) one or more copolymers prepared with at least tricyclodecane dimethanol (TCDDM) or a compound of formula (I):

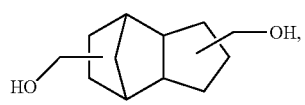

thereby the copolymer(s) comprising a repeating unit derived therefrom, (3) one or more polyesters. The compositions in various embodiments contain a residual of the tricyclodecane dimethanol in an amount of between 1 wt % and 70 wt % relative to the composition.

In some embodiments, the one or more polyesters are a polyalkylene terephthalate-type polyester, and/or having a repeating unit of

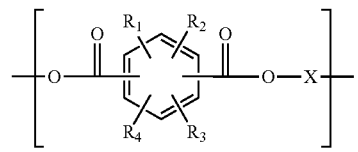

wherein X is a divalent aliphatic hydrocarbon group having 2 to 6 carbon atoms, and $R_1$, $R_2$, $R_3$ and $R_4$ are individually hydrogen, an alkyl having 1 to 6 carbon atoms, a halogen, an alkoxy having 1 to 6 carbon atoms, an alkoxycarbonyl having 2 to 6 carbon atoms, cyano, amino, sulfonyl, nitro or phenoxy. Further embodiments provide the one or more polyesters in the compositions is polybutylene terephthalate (PBT), polybutylene isophthalate (PBI), polyethylene terephthalate (PET), polyethylene isophthalate (PEI), polytrimethylene terephthalate (PTT), polytrimethylene isophthalate (PTI), a thermoplastic polyether-ester elastomer (TPEE), a copolymer thereof, or a combination thereof.

In some embodiments, the one or more inorganic fillers can be glass fiber, quartz, amorphous silica, colloidal silica, ceramics, zirconia, or a combination thereof.

In some embodiments, the one or more copolymers is derived from at least TCDDM and terephthalic acid (PTA). Further embodiments of the one or more copolymers is derived from TCDDM, PTA and an alkanediol.

Hence, some embodiments of the compositions include an inorganic filler, a TCDDM-modified polymer (e.g., a copolymer derived from TCDDM, PTA and 1,4-butanediol (BDO)), and a terephthalate-type polyester (e.g., PBT), wherein the content of TCDDM residual is between 1 wt % and 70 wt % in the composition.

The compositions of the invention in various embodiments have a transmittance of not less than 10% at a wavelength of 800 nm to 1200 nm in terms of a thickness of 1.5 mm in a molded product comprising the compositions. Further embodiments provide the compositions have a transmittance at two or more locations of a product comprising the compositions being less than 12% difference. For example, the compositions have a transmittance of $X_1$% at one location for a wavelength in terms of a thickness of 1.5 mm, and another transmittance of $X_2$% at another location for the wavelength in terms of also a thickness of 1.5 mm, for a product comprising the compositions, and the difference in $X_1$ and $X_2$ is less than 12 such that the difference in transmittance of the wavelength at two locations is less than 12% of full transmittance.

The above summary is not intended to represent every embodiment or every aspect of the present disclosure. Rather, the foregoing summary merely provides an example of some of the novel aspects and features set forth herein. Other features and advantages of the invention will become apparent from the following detailed description, taken in conjunction with the accompanying drawings, which illustrate, by way of example, various features of embodiments of the invention.

BRIEF DESCRIPTION OF THE FIGURES

Exemplary embodiments or comparative examples are illustrated in referenced figures. It is intended that the embodiments and figures disclosed herein are to be considered illustrative rather than restrictive.

DETAILED DESCRIPTION

Figure 1:
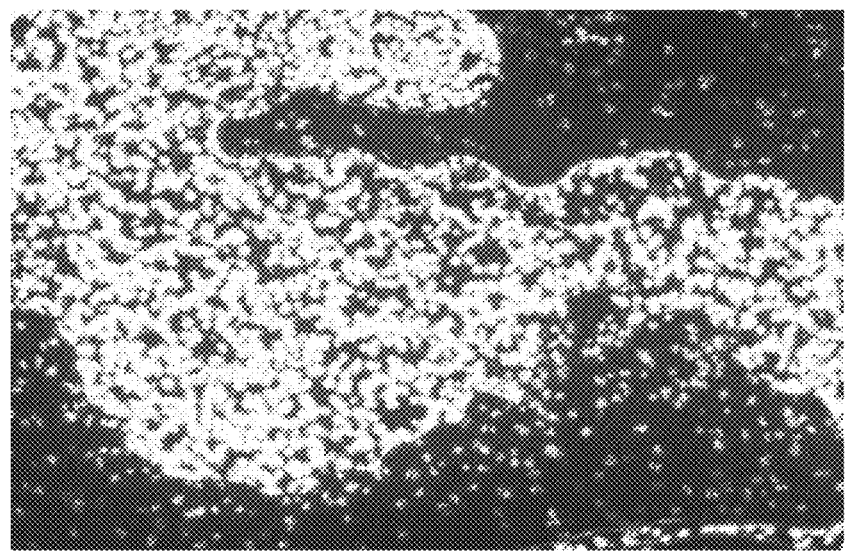
FIG. 1 is a polarized light microscopic image of a comparative example ("C1" in Table 1 below) which was prepared with glass fiber (30 wt %), PBT resin (53.6 wt %), polycarbonate (15 wt %), an anti-oxidant (0.2 wt %) and a lubricant (0.2 wt %). The blend of PBT with polycarbonate in a composition shows apparent phase separation under microscopy, which indicates non-uniformity in at least the optical property of this composition.

The term "polymer" generally includes homopolymers, copolymers (such as for example, block, graft, random and alternating copolymers), terpolymers, and blends and modifications thereof. Furthermore, unless otherwise specifically limited, the term "polymer" shall include all possible geometrical configurations of the material. These configurations include isotactic, syndiotactic and random symmetries.

The term "polyester" is intended to embrace polymers wherein at least 85% of the recurring units are condensation products of dicarboxylic acids and dihydroxy alcohols with polymer linkages created by formation of an ester unit. This includes aromatic, aliphatic, saturated, and unsaturated di-acids and di-alcohols. The term "polyester" also includes copolymers (such as block, graft, random and alternating copolymers), blends, and modifications thereof. An example of a polyester is PBT which is a condensation product of BDO and PTA.

The term "tricyclodecane dimethanol" (TCDDM) refers to a compound of

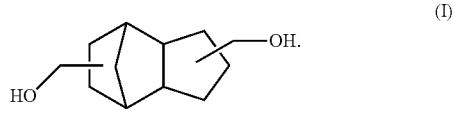

formula (I): In some embodiments, formula (I) includes any one or more of 3,8-bis(hydroxymethyl)tricyclo[5.2.1.0$^{2-6}$]decane; 3,9-bis(hydroxymethyl)tricyclo[5.2.1.0$^{2-6}$]decane; 4,8-bis(hydroxymethyl)tricyclo[5.2.1.0$^{2-6}$]decane; 4,9-bis(hydroxymethyl)tricyclo[5.2.1.0$^{2-6}$]decane; 5,8-bis(hydroxymethyl)tricyclo[5.2.1.0$^{2-6}$]decane; and 5,9-bis(hydroxymethyl)tricyclo[5.2.1.0$^{2-6}$]decane. In some embodiments, TCDDM is octahydro-4,7-methano-1H-indene-1,5-dimethanol.

The term "terephthalic acid" refers to a compound of formula (II):

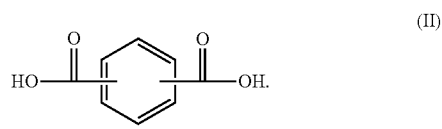

In some embodiments, formula (II) includes any one or more of 1,4-benzenedicarboxylic acid, 1,3-benzenedicarboxylic acid, and 1,2-benzenedicarboxylic acid. In some embodiments, PTA refers to 1,4-benzenedicarboxylic acid.

Compositions are provided whose components include at least an inorganic filler, a copolymer, and a polyester. In some aspects, the compositions are a blend or mixture of the components. In some aspects, the compositions are laser transmissive. In some aspects, the compositions are in the form of a resin.

Copolymers

Various embodiments provide that a copolymer in the composition is derived from or prepared from at least one, two, or three different (co-)monomers. In some embodiments, the monomers forming the copolymer include any one or more of compounds of formulae (I)-(III):

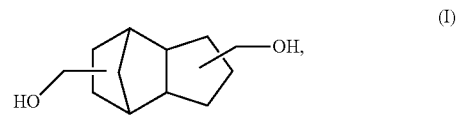

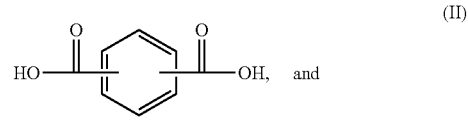

and Y is an aliphatic hydrocarbon group having 2 to 6 carbon atoms.

In one embodiment, the copolymer is derived from comonomers represented by formula (I), formula (II) and formula (III). In some aspects, the copolymer comprises a repeating unit having a structure of

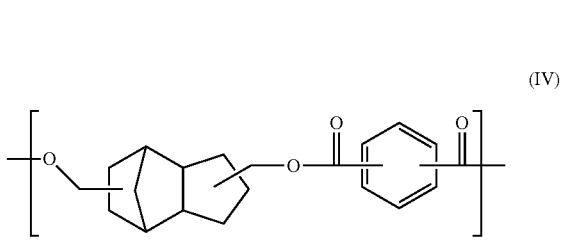

and another repeating unit having a structure of

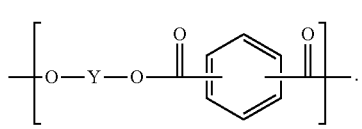
(V)

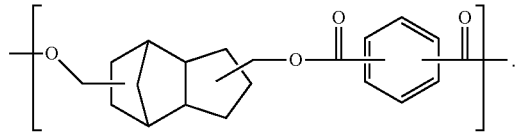
(IV)

In further aspects, the copolymer is derived from compounds of formula (I), (II) and (III), wherein one or two or three of these compounds are individually substituted with one or more alkyl having 1 to 6 carbon atoms, one or more halogen, one or more alkoxy having 1 to 6 carbon atoms, one or more alkoxycarbonyl having 2 to 6 carbon atoms, cyano, amino, sulfonyl, nitro or phenoxy.

In another embodiment the copolymer is derived from monomers represented by formula (I) and formula (II), without the compound of formula (III). In some aspects, the copolymer comprises a repeating unit having a structure of In further aspects, the copolymer is derived from compounds of formula (I) and (II), wherein one or both of these compounds are individually substituted with one or more alkyl having 1 to 6 carbon atoms, one or more halogen, one or more alkoxy having 1 to 6 carbon atoms, one or more alkoxycarbonyl having 2 to 6 carbon atoms, cyano, amino, sulfonyl, nitro or phenoxy.

In one embodiment, the copolymer in the composition has one or more repeating units represented by one or more of formulae (IV)-(VI):

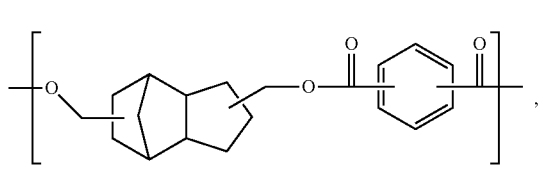
(IV),

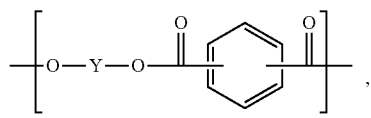
(V),

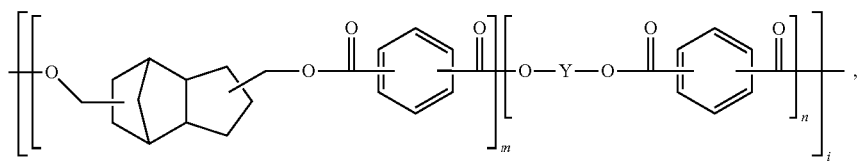
(VI), wherein m and n are individually in each repeating unit independently an integer greater or equal to 1, and Y is an aliphatic hydrocarbon group having 2 to 6 carbon atoms.

In a further embodiment, the copolymer in the composition has a formula (VII):

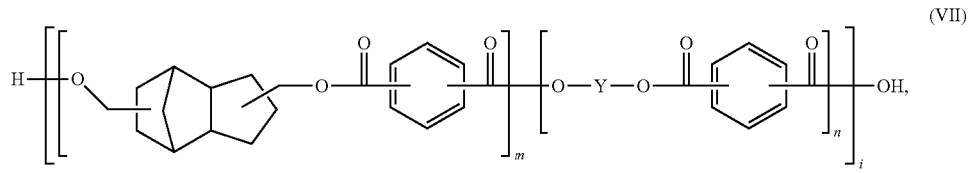
(VII)

(VII), wherein m is an integer greater or equal to 1 (e.g., from 1 to 100,000) and may be the same or different in each fraction (e.g., each repeat of the bracket subscriptted i) of the copolymer, n is an integer greater or equal to 1 (e.g., from 1 to 100,000) and may be the same or different in each fraction (e.g., each repeat of the bracket subscriptted i) of the copolymer, i is an integer greater than 1 (e.g., from 2 to 100,000), and Y is an aliphatic hydrocarbon group having 2 to 6 carbon atoms.

Further embodiments provide the copolymer is a polyester modified with one or more functional groups derived from a compound of formula (I) and the polyester before the modification can be the same or different from the polyester that is another component of the compositions.

Various embodiments provide the fraction derived from the monomer represented by formula (I), or the content of TCDDM residual, in the copolymer is in an amount of about 1 wt %-5 wt %, 5 wt %-10 wt %, 10 wt %-15 wt %, 15 wt %-20 wt %, 20 wt %-25 wt %, 25 wt %-30 wt %, 30 wt %-40 wt %, 40 wt %-50 wt %, 50 wt %-60 wt %, 60 wt %-70 wt % relative to the copolymer. TCDDM residual in various embodiments refers to tricyclodecane dihydroxymethyl group and/or tricyclodecane methanol monohydroxymethyl end group in a polymer.

Various aspects provide the composition is a polymer derived from comonomers containing a compound of formula (I), a compound of formula (II) and optionally a compound of formula (III), each independently optionally having one or more substitutions, in a molar ratio of compound of formula (I):compound of formula (II):compound of formula (III) (a:b:c), wherein a is a number greater than 0 and up to 10; b is a number greater than 0 and up to 10; and c is a number from 0 to 10. In one embodiment, c=0 and a=b=1. In one embodiment, b=a+c. In one embodiment, b>a. In one embodiment, c>b. In yet another embodiment, c>a, and c>b.

In one embodiment, the composition comprises a copolymer derived from TCDDM, PTA and BDO. In a further embodiment, the composition comprises a copolymer derived from TCDDM, PTA and BDO, wherein the molar ratio of the TCDDM to the BDO is about 1:1, 1:2, 1:3, 1:4, 1:5, 1:6, 1:7, 1:8, 1:9, 1:10, 1:11, 1:12, 1:13, 1:14, or 1:15. In another embodiment, the composition comprises a copolymer derived from TCDDM, PTA and BDO, wherein the molar ratio of the TCDDM to the BDO is about 1:2. In another embodiment, the composition comprises a copolymer derived from TCDDM, PTA and BDO, wherein the molar ratio of the TCDDM to the BDO is about 1:4.98. Yet in another embodiment, the composition comprises a copolymer derived from TCDDM, PTA and BDO, wherein the molar ratio of the TCDDM to the BDO is about 1:14.02.

In another embodiment, the composition comprises a copolymer derived from TCDDM and PTA, without BDO.

Further embodiments provide the copolymer in a composition is in an amount between about 1 wt % to about 99 wt % relative to the composition. In some aspects, the copolymer in a composition is in an amount between about 10 wt % to about 70 wt % relative to the composition. In further aspects, the copolymer in a composition is in an amount between about 15 wt % to about 50 wt % relative to the composition. In one aspect, the copolymer in a composition is in an amount of about 11 wt %, 12 wt %, 13 wt %, 14 wt %, 15 wt %, 16 wt %, 17 wt %, 18 wt %, 19 wt % or 20 wt %. In another aspect the copolymer in a composition is in an amount of about 30 wt %. In yet another aspect the copolymer in a composition is in an amount of about 50 wt % relative to the composition.

Various embodiments provide the content of TCDDM residual in a composition of the invention (the composition including at least an inorganic filler, a copolymer, and a polyester) is in an amount of about 0.1 wt %-1 wt %, 1 wt %-5 wt %, 5 wt %-10 wt %, 10 wt %-15 wt %, 15 wt %-20 wt %, 20 wt %-25 wt %, 25 wt %-30 wt %, 30 wt %-40 wt %, 40 wt %-50 wt %, 50 wt %-60 wt %, or 60 wt %-70 wt % relative to the composition. In one embodiment, the content of TCDDM residual is about 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, or 35 wt %, or in a range between any two numbers listed, relative to the composition. In one embodiment, the content of TCDDM residual is about 1 wt %-7 wt % relative to the composition. In one embodiment, the content of TCDDM residual is about 7 wt %-14 wt % relative to the composition. In one embodiment, the content of TCDDM residual is about 14 wt %-20 wt % relative to the composition. In one embodiment, the content of TCDDM residual is about 20 wt %-35 wt % relative to the composition. In one embodiment, the content of TCDDM residual is about 35 wt %-50 wt % relative to the composition. In one embodiment, the content of TCDDM residual is about 50 wt %-70 wt % relative to the composition.

Various embodiments provide that any one of the disclosed copolymers in the composition individually has an intrinsic viscosity of at least 0.6 dL/g, between about 0.7 dL/g and about 0.8 dL/g, or between about 0.6 dl/g and 1 dl/g. Further embodiments provide that any one of the disclosed copolymers in the composition individually has a melting temperature in a range from 225° C. to 150° C., or about 225° C., 220° C., 215° C., 210° C., 205° C., 200° C., 195° C., 190° C., 185° C., 180° C., 175° C., 170° C., 165° C., 160° C., 155° C., or 150° C., or in a range between any of the two values. Without being bound by a theory, as the TCDDM residual amount increases in the copolymers, the melting point of the copolymers generally decreases, and the melting point of PBT itself is about 225° C. Yet further embodiments provide that any one of the disclosed copolymers in the composition individually has a molecular weight of about 800-900 g/mol, 900-1000 g/mol, 1000-1100 g/mol, 1100-1200 g/mol, 1200-1300 g/mol, 1300-1400 g/mol, 1400-1500 g/mol, 1500-1600 g/mol, 1600-1700 g/mol, 1700-1800 g/mol, 1800-1900 g/mol, 1900-2000 g/mol, 2000-5000 g/mol, 5000-10000 g/mol, or greater. In some aspects, the copolymer and the polyester in the composition have similar molecular weights, e.g., difference being less than 10%, 20%, 30%, 40% or 50% compared to the larger molecular weight of the two.

Polyesters

In one embodiment, the polyester is PBT. In another embodiment, the polyester is an aromatic polyester produced by polycondensing PTA or dimethyl terephthalate with BDO. Other embodiments provide the polyester is PET, PEI, PPT, PPI, PTT, PTI, PBT, PBI, a TPEE (e.g., polyethylene-p-phenylene ester ether, polyethylene-m-phenylene ester ether, polyethylene-o-phenylene ester ether, polytrimethylene-p-phenylene ester ether, polytrimethylene-m-phenylene ester ether, polytrimethylene-o-phenylene ester ether, polybutylene-p-phenylene ester ether, polybutylene-m-phenylene ester ether, polybutylene-o-phenylene ester ether), or a mixture or copolymer thereof. Yet other embodiments provide aliphatic polyesters that include the polyalkylene phenylene esters and polyalkylene phenylene ester ethers having a repeating unit represented by formula (VIII):

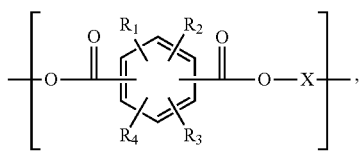

(VIII)

wherein $R_1$, $R_2$, $R_3$ and $R_4$ are the same or different and are each hydrogen, an alkyl having 1 to 6 carbon atoms (e.g., methyl, ethyl, n-propyl, isopropyl), a halogen (e.g., fluorine, bromine, chlorine), an alkoxy having 1 to 6 carbon atoms (e.g., methoxy, ethoxy), an alkoxycarbonyl having 2 to 6 carbon atoms (e.g., methoxycarbonyl, ethoxycarbonyl), cyano, amino, sulfonyl, nitro or phenoxy; X is a divalent aliphatic hydrocarbon group having 1 to 10 carbon atoms (e.g. methylene, dimethylene, trimethylene, tetramethylene, pentamethylene, hexamethylene, heptamethylene, octamethylene, nonamethylene, decamethylene, ethylene, propylene, methyltrimethylene, butylene).

Some embodiments provide the composition comprises a polyester of the above-mentioned structure and having an IV between 0.6 dL/g and 0.9 dL/g. Some embodiments provide the composition comprises a polyester of the above-mentioned structure and having an IV between 0.7 dL/g and 0.8 dL/g.

Further embodiments provide that the composition comprises a polyester of the above-mentioned structure and having a carboxylic end group (CEG) content of no more than 15 meq/kg relative to the weight of the polyester. One embodiment provides that the composition comprises a polyester of the above-mentioned structure and having a CEG content of no more less than 14 meq/kg relative to the weight of the polyester. One embodiment provides that the composition comprises a polyester of the above-mentioned structure and having a CEG content of less than 13 meq/kg relative to the weight of the polyester. One embodiment provides that the composition comprises a polyester of the above-mentioned structure and having a CEG content of less than 12 meq/kg relative to the weight of the polyester. One embodiment provides that the composition comprises a polyester of the above-mentioned structure and having a CEG content of less than 11 meq/kg relative to the weight of the polyester. One embodiment provides that the composition comprises a polyester of the above-mentioned structure and having a CEG content of or less than 10 meq/kg relative to the weight of the polyester. In further aspects, a disclosed polyester has a CEG content in a range between 5 and 15 meq/kg, between 7 and 13 meq/kg, or between 8 and 12 meq/kg, relative to the weight of the polyester.

In various embodiments, the polyester in a composition is in an amount of about 10 wt %-20 wt %, 20 wt %-30 wt %, 30 wt %-40 wt %, 40 wt %-50 wt %, 50 wt %-60 wt %, 60 wt %-70 wt %, 70 wt %-80 wt %, or 80 wt %-90 wt % relative to the composition. In one embodiment, the polyester in the composition is a polybutylene terephthalate in an amount of between about 15 wt % and 75 wt % relative to the composition. In another embodiment, the polyester in the composition is a polybutylene terephthalate in an amount of between about 35 wt % and 70 wt % relative to the composition.

Inorganic fillers, Additives or Others

The compositions can contain, in addition to the above-described components, a fibrous, granular or platy filler depending on the purpose so as to obtain properties in the mechanical strength, thermal resistance, optional transmittance, dimensional stability (resistance to deformation and warp) and electric properties or to not have any adverse effects on the laser transmissivity. In various embodiments, a laser-transmitting filler or additive is preferred.

Exemplary fibrous fillers as a component of the composition include a glass fiber, a silica fiber, an alumina fiber, a silica•alumina fiber, an aluminum silicate fiber, a zirconia fiber, a potassium titanate fiber, a whisker (e.g., a whisker of silicon carbide, alumina, boron nitride, or the like), and a wollastonite. Exemplary plate-like fillers include a talc, a mica, and a glass flake. Exemplary particulate fillers include a glass bead, a glass powder or a powdered glass, a milled fiber, a clay, an organized clay, a porcelain claim, potassium titanate, calcium carbonate, titanium oxide, a feldspathic mineral, and a graphite.

In some embodiments, the compositions comprise, in addition to the above-mentioned components, an organic fiber, e.g., an aliphatic or aromatic polyamide, an aromatic polyester, an acrylic resin such as a polyacrylonitrile, a fiber formed from a rayon or the like, and/or a carbon fiber.

Various embodiments provide the inorganic filler (e.g., glass fiber) is in an amount of about 0.1 wt %-1 wt %, 1 wt %-10 wt %, 10 wt %-20 wt %, 20 wt %-30 wt %, 30 wt %-40 wt %, 40 wt %-50 wt %, or 50 wt %-70 wt % in the composition. One embodiment provides the inorganic filler is in an amount of about 0.1 wt %-10 wt % in the composition. One embodiment provides the inorganic filler is in an amount of about 10 wt %-20 wt % in the composition. One embodiment provides the inorganic filler is in an amount of about 20 wt %-40 wt % in the composition. One embodiment provides the inorganic filler is in an amount of about 40 wt %-60 wt % in the composition. One embodiment provides the inorganic filler is in an amount of about 60 wt %-70 wt % in the composition.

Various aspects of the compositions provide that each may further include one or more additives, modifiers or reinforcing agents to provide broad property profiles. Exemplary additives include stabilizers (e.g., ultraviolet absorbers), antioxidants (e.g., phosphites, phenols, quinones, phenothiazines), heat stabilizers, UV stabilizers, lubricants (e.g., nonionic lubricant such as emulsified or sulphonated mineral oil, cationic lubricant such as polyethylenimine salt, tetraethylenepentaamine, or a polyamine), mold release agents, catalyst deactivators, nucleating agent such as metal salts (e.g., sodium carbonate or sodium bicarbonate), crystallization accelerators or the like. In some embodiments, additives such as antioxidants, lubricant and nucleating agents are in combination in an amount of about 1%-5% in weight in the compositions.

In further embodiments, the compositions disclosed herein each further include polycarbonate. In other embodiments, the compositions disclosed herein do not include polycarbonate.

Preparation of the Compositions

Various embodiments provide a composition disclosed herein are in the form of a resin. The composition is typically prepared by mixing uniformly the components (e.g., a combination of at least the copolymers, the polyesters and inorganic fillers, and optionally other additives) in a controlled manner in a mixing machine, for instance a BANBURY® mixer, a BRABENDER® mixer, a roll mill, or an extruder (e.g., a screw extruder). In some aspects, the mixture is extruded, cooled and becomes a pellet; or is cut or molded into any shape (e.g., films, filaments, round, square, rectangle, particulates, microparticulates, or the like.) In some aspects to allow for even mixing, a mixing temperature is raised to about 150° C.-175° C., 175° C.-200° C., 200° C.-250° C., 250° C.-300° C., or 300° C.-350° C. In one embodiment, the temperature for mixing is above the melting temperatures of the copolymer and of the polyester. In one embodiment, the temperature for mixing is above the melting temperature of the copolymer. In one embodiment, the temperature for mixing is above the melting temperature of the polyester. In yet another embodiment, the temperature for mixing is above the melting temperatures of the copolymer, of the polyester and of the inorganic filler.

The copolymers are in various embodiments tricyclodecane dimethanol-modified polyesters. Tricyclodecane dimethanol-modified polyesters can be prepared by mixing the monomers (e.g., carboxylic acid-containing compounds, tricyclodecane dimethanol, and optionally another alcohol-containing compounds) optionally in the presence of a catalyst at a raised temperature to allow for esterification to proceed, e.g., between 180° C.-190° C., 190° C.-200° C., 200° C.-210° C., 210° C.-220° C., 220° C.-230° C., 230° C.-240° C., or 240° C.-250° C., for a period of time. In various aspects, when esterification is about 85%, 86%, 87%, 88%, 89%, 90%, 91%, 92%, 93%, 94%, 95%, 96%, 97%, 98%, 99% or 100% completed (e.g., indicated by water content generated from the esterification reaction). The pressure in the reactor is reduced, e.g., to 0.1 mmHg. In various aspects, the esterification reaction is carried out in a controlled mixing environment whereby an intrinsic viscosity of the mixture (product) in a desirable range (e.g., at about 0.7 dL/g, or about 0.7-0.8 dL/g) is achieved by controlling the torque of the stirrer. An exemplary controlled manner in the mixing includes maintaining a controlled fluid level in the machine (e.g., no more than 35%, 30%, 25%, or 20%), a controlled viscosity of the mixture (e.g., no more than 75 Pa·s), and a controlled current for a continuous agitation of the reaction mixture.

Products, Properties and Uses Thereof

A product comprising or consisting of the compositions of the invention has a consistent light transmittance at different locations across the product, wherein the light transmittance for a wavelength between 800 nm and 1200 nm in terms of a product thickness of 1.5 mm is at most 12% difference at any two locations of the product comprising or consisting of the compositions of the invention. In some embodiments, a product made of the compositions of the invention has a light transmittance of $X_1$% in one spot that is 1.5 mm in thickness or resulting in 1.5 mm path length for the light, and a second light transmittance of $X_2$% in another spot that is 1.5 mm in thickness or resulting in 1.5 mm path length for the light, wherein the light is at a wavelength between 800 nm and 1200 nm, $X_1 \geq 10$, $X_2 \geq 10$, and $|X_1-X_2| \leq 12$, and the two spot can be at least 1 mm apart, 2 mm apart, 3 mm apart, 4 mm apart, 5 mm apart, 6 mm apart, 7 mm apart, 8 mm apart, 9 mm apart, 1 cm apart, 2 cm apart, 3 cm apart, 4 cm apart, 5 cm apart, 10 cm apart, 20 cm apart, 30 cm apart, 40 cm apart, or 50 cm apart, or farther apart, hence the product made of the compositions of the invention can have a consistent (deviation $|X_1-X_2| \leq 12$) light transmittance for a large area (volume). In another aspect, in terms of a composition of invention of 1.5 mm in thickness or resulting in 1.5 mm path length for a (e.g., laser) light wavelength, $20 \leq X_1 \leq 35$, $20 \leq X_2 \leq 35$, and $|X_1-X_2| \leq 12$. Yet in another embodiment, in terms of a composition of invention of 1.5 mm in thickness or resulting in 1.5 mm path length for a (e.g., laser) light wavelength, the optical transmittance of the composition satisfies: (1) $X_1$ is about any integer between 11 and 20 or in a range between any two integers from 11 to 20, $X_2$ is about any integer between 11 and 20 or in a range between any two integers from 11 to 20, and $|X_1-X_2| \leq 5$; (2) $X_1$ is greater than 20 and smaller than 35, or in a range between any two integers from 21 to 34, $X_2$ is greater than 20 and smaller than 35, or in a range between any two integers from 21 to 34, and $|X_1-X_2| \leq 12$; or (3) $X_1 \geq 35$, $X_2 \geq 35$, and $|X_1-X_2| \leq 5$. In another aspect, optical transmittance (X %) has a deviation $|X_1-X_2| \leq 5$. In another aspect, optical transmittance (X %) has a deviation $|X_1-X_2| \leq 4$. In another aspect, optical transmittance (X %) has a deviation $|X_1-X_2| \leq 3$. In another aspect, optical transmittance (X %) has a deviation $|X_1-X_2| \leq 2$. In another aspect, optical transmittance (X %) has a deviation $|X_1-X_2| \leq 1$.

In further embodiments, a product made of a composition of the invention may have different shapes or thicknesses, yet still consistent light transmittance at various spots/locations, taking into consideration the path length of light through the product. Optical transmittance is thickness dependent. For example, the absorbance of light through a thickness of a composition of the invention is proportional to the path length of the light through the composition. Transmittance (expressed in terms of percentage of light) is 100% minus absorbance (expressed in terms of percentage). Hence, a product made of a composition of the invention at various locations has light transmittance that is within 12% difference when comparing the normalized transmittance in terms of 1.5 mm thickness at the various locations.

Various embodiments provide the compositions of the invention have a transmittance, $X_i$%, at a wavelength of 800 to 1200 nm in terms of a thickness of 1.5 mm in a molded product comprising the compositions, wherein $X_i \geq 10$, and i=1 indicates transmittance measurement at a first location, i=2 indicates transmittance measurement at a second location, wherein $|X_1-X_2| \leq 12$. In some embodiments, $10 \leq X_1 \leq 75$, $10 \leq X_2 \leq 75$, and $|X_1-X_2| \leq 12$ for a wavelength of about 980 nm in terms of a thickness of 1.5 mm in a product comprising the compositions. In some embodiments, the compositions comprise an inorganic filler, a TCDDM-modified alkylene terephthalate-type polyester, and an alkylene terephthalate, and the compositions have a transmittance, $X_i$%, at a wavelength of about 980 nm in terms of a thickness of 1.5 mm in a molded product comprising the compositions, wherein $11 \leq X_1 \leq 40$, $11 \leq X_2 \leq 40$, and $|X_1-X_2| \leq 12$. In some embodiments, the compositions comprise an inorganic filler, a TCDDM-modified alkylene terephthalate-type polyester, and an alkylene terephthalate, and the compositions have a transmittance, $X_i$%, at a wavelength of about 980 nm in terms of a thickness of 1.5 mm in a molded product comprising the compositions, wherein $11 \leq X_1 \leq 20$, $11 \leq X_2 \leq 20$, and $|X_1-X_2| \leq 5$. In some embodiments, the compositions comprise an inorganic filler, a TCDDM-modified alkylene terephthalate-type polyester, and an alkylene terephthalate, and the compositions have a transmittance, $X_i$%, at a wavelength of about 980 nm in terms of a thickness of 1.5 mm in a molded product comprising the compositions, wherein $20 \leq X_1 \leq 35$, $20 \leq X_2 \leq 35$, and $|X_1-X_2| \leq 12$. And in yet some embodiment, the compositions comprise an inorganic filler, a TCDDM-modified alkylene terephthalate-type polyester, and an alkylene terephthalate, and the compositions have a transmittance, $X_i$%, at a wavelength of about 980 nm in terms of a thickness of 1.5 mm in a molded product comprising the compositions, wherein $30 \leq X_1 \leq 40$, $30 \leq X_2 \leq 40$, and $|X_1-X_2| \leq 5$.

Further embodiments provide the transmittance at two or more positions of the molded product is within 5% variations and at each position not less than 10% for the wavelength of 800 to 1200 nm in terms of a thickness of 1.5 mm. For example, the compositions have a transmittance difference that is within a range of no more than 5% of total transmittance at various locations of a molded product comprising the compositions at a wavelength of about 980 nm in terms of a thickness of 1.5 mm, and the transmittance can range 10%-15%, 11%-16%, 12%-17%, 13%-18%, 14-19%, 15%-20%, 16%-21%, 17%-22%, 18%-23%, 19%-24%, 20%-25%, 21%-26%, 22%-27%, 23%-28%, 24%-29%, 25%-30%, 26%-31%, 27%-32%, 28%-33%, 29%-34%, 30%-35%, 31%-36%, 32%-37%, 33%-38%, 34%-39%, 35%-40%, 36%-41%, 37%-42%, 38%-43%, 39%-44%, 40%-45%, 41%-46%, 42%-47%, 43%-48%, 44%-49%, 45%-50%, 46%-51%, 47%-52%, 48%-53%, 49%-54%, 50%-55%, 51%-56%, 52%-57%, 53%-58%, 54%-59%, 55%-60%, 56%-61%, 57%-62%, 58%-63%, 59%-64%, 60%-65%, 61%-66%, 62%-67%, 63%-68%, 64%-69%, or 65%-70%. In other words, the compositions of the invention have a transmittance of not less than 10% at a wavelength of 800 to 1200 nm in terms of a thickness of 1.5 mm in a molded product comprising the compositions, and the transmittance, expressed in percentage, across the molded product is at most 1%, 2%, 3%, 4% or 5% transmittance different.

The compositions in various embodiments comprise a TCDDM-modified copolymer, or a residual of TCDDM in the backbone and/or end group of the copolymer, and the copolymer is one component of the compositions. The TCDDM residual in the overall compositions of the invention is 1 wt % to 70 wt %. In some embodiment, the TCDDM residual in the overall compositions is 1 wt % to 10 wt %. In some embodiment, the TCDDM residual in the overall compositions is 10 wt % to 20 wt %. In some embodiment, the TCDDM residual in the overall compositions is 20 wt % to 30 wt %. In some embodiment, the TCDDM residual in the overall compositions is 30 wt % to 40 wt %. In some embodiment, the TCDDM residual in the overall compositions is 40 wt % to 50 wt %.

Hence in one embodiment, a composition of the invention comprises (1) an inorganic filler, (2) a TCDDM-modified butylene terephthalate-type polyester, and (3) PBT, wherein the fraction derived from TCDDM (or TCDDM residual) is about 20 wt % (or between about 15 wt % and 25 wt %) in the TCDDM-modified butylene terephthalate-type polyester, and/or the TCDDM residual in the overall composition is about 1 wt % to 5 wt %, the compositions have a transmittance in the range between 13% and 20% at a wavelength of 800 to 1200 nm in terms of a thickness of 1.5 mm at any locations (e.g., across a distance of at least 1 cm, 2 cm, 3 cm, 4 cm, or 5 cm) in a molded product comprising the composition, wherein at two locations having a difference of about 3% to 4% in transmittance, and a laser welded product comprising a laser transmissive part made with the composition has a bonding strength of about 20 MPa or at least 20 MPa.

In another embodiment, a composition of the invention comprises (1) an inorganic filler, (2) a TCDDM-modified butylene terephthalate-type polyester, and (3) PBT, wherein the fraction derived from TCDDM is about 8.5 wt % (or between about 5 wt % and 10 wt %) in the TCDDM-modified butylene terephthalate-type polyester, and/or the TCDDM residual in the overall composition is about 1.4 wt % (or between 0.5 wt % and 1.5 wt %), the compositions have a transmittance of about 12% (or between 11% and 13%) at a wavelength of 800 to 1200 nm in terms of a thickness of 1.5 mm at any locations (e.g., across a distance of at least 1 cm, 2 cm, 3 cm, 4 cm, or 5 cm) in a molded product comprising the composition, wherein at two locations having a difference of about 0.1% to 1% in transmittance, and a laser welded product comprising a laser transmissive part made with the composition has a bonding strength of about 20 MPa or at least 20 MPa.

In another embodiment, a composition of the invention comprises (1) an inorganic filler, (2) a TCDDM-modified butylene terephthalate-type polyester, and (3) PBT, wherein the fraction derived from TCDDM is about 36 wt % (or between about 30 wt % and 40 wt %) in the TCDDM-modified butylene terephthalate-type polyester, and/or the TCDDM residual in the overall composition is about 5.7 wt % (or between 4 wt % and 7 wt %), the compositions have a transmittance of about 15% (or between 13% and 17% or at least 14%) at a wavelength of 800 to 1200 nm in terms of a thickness of 1.5 mm at any locations (e.g., across a distance of at least 1 cm, 2 cm, 3 cm, 4 cm, or 5 cm) in a molded product comprising the composition, wherein at two locations having a difference of about 2% to 3% in transmittance, and a laser welded product comprising a laser transmissive part made with the composition has a bonding strength of at least 20 MPa.

In another embodiment, a composition of the invention comprises (1) an inorganic filler, (2) a TCDDM-modified butylene terephthalate-type polyester, and (3) PBT, wherein the fraction derived from TCDDM is about 60 wt % (or between about 50 wt % and 70 wt %) in the TCDDM-modified butylene terephthalate-type polyester, and/or the TCDDM residual in the overall composition is about 10 wt % (or at least 8 wt %), the compositions have a transmittance of about 11% (or at least 10%) at a wavelength of 800 to 1200 nm in terms of a thickness of 1.5 mm at any locations (e.g., across a distance of at least 1 cm, 2 cm, 3 cm, 4 cm, or 5 cm) in a molded product comprising the composition, wherein at two locations having a difference of about 0.5% (or less than 1%) in transmittance, and a laser welded product comprising a laser transmissive part made with the composition has a bonding strength of about 20 MPa or at least 17 MPa.

In another embodiment, a composition of the invention comprises (1) an inorganic filler, (2) a TCDDM-modified butylene terephthalate-type polyester, and (3) PBT, wherein the fraction derived from TCDDM is about 60 wt % (or between about 50 wt % and 70 wt %) in the TCDDM-modified butylene terephthalate-type polyester, and/or the TCDDM residual in the overall composition is about 18 wt % (or at least 15 wt %), the compositions have a transmittance of about 12% (or at least 11%) at a wavelength of 800 to 1200 nm in terms of a thickness of 1.5 mm at any locations (e.g., across a distance of at least 1 cm, 2 cm, 3 cm, 4 cm, or 5 cm) in a molded product comprising the composition, wherein at two locations having a difference of about 0.1% (or less than 0.5%) in transmittance, and a laser welded product comprising a laser transmissive part made with the composition has a bonding strength of about 20 MPa or at least 17 MPa.

In another embodiment, a composition of the invention comprises (1) an inorganic filler, (2) a TCDDM-modified butylene terephthalate-type polyester, and (3) PBT, wherein the fraction derived from TCDDM is about 60 wt % (or between about 50 wt % and 70 wt %) in the TCDDM-modified butylene terephthalate-type polyester, and/or the TCDDM residual in the overall composition is about 30 wt % (or at least 25 wt %), the compositions have a transmittance of about 38% (or at least 35%; or between 35% and 45%) at a wavelength of 800 to 1200 nm in terms of a thickness of 1.5 mm at any locations (e.g., across a distance of at least 1 cm, 2 cm, 3 cm, 4 cm, or 5 cm) in a molded product comprising the composition, wherein at two locations having a difference of about 0.3% (or less than 0.5%) in transmittance, and a laser welded product comprising a laser transmissive part made with the composition has a bonding strength of about 18 MPa or at least 17 MPa.

In one embodiment, a composition of the invention comprises (1) an inorganic filler, (2) a TCDDM-modified butylene terephthalate-type polyester, and (3) PBT, wherein the fraction derived from TCDDM is about 20 wt % (or between about 15 wt % and 25 wt %) in the TCDDM-modified butylene terephthalate-type polyester, and/or the TCDDM residual in the overall composition is about 6 wt % (or between 4 wt % and 10 wt %), the compositions have a transmittance of at least 20% (or in the range between 20% and 40% at a wavelength of 800 to 1200 nm in terms of a thickness of 1.5 mm at any locations (e.g., across a distance of at least 1 cm, 2 cm, 3 cm, 4 cm, or 5 cm) in a molded product comprising the composition, wherein at two locations having a difference of about 11% (or less than 12%) in transmittance, and a laser welded product comprising a laser transmissive part made with the composition has a bonding strength of about 22 MPa or at least 20 MPa.

In another embodiment, a composition of the invention comprises (1) an inorganic filler, at about 10 wt % in the overall composition, (2) a TCDDM-modified butylene terephthalate-type polyester, and (3) PBT, wherein the fraction derived from TCDDM is about 60 wt % (or between about 50 wt % and 70 wt %) in the TCDDM-modified butylene terephthalate-type polyester, and/or the TCDDM residual in the overall composition is about 10 wt % (or between 5 wt % and 15 wt %), the compositions have a transmittance of about 12% (or between 10% and 15%) at a wavelength of 800 to 1200 nm in terms of a thickness of 1.5 mm at any locations (e.g., across a distance of at least 1 cm, 2 cm, 3 cm, 4 cm, or 5 cm) in a molded product comprising the composition, wherein at two locations having a difference of about 0.2% (or less than 0.5%) in transmittance, and a laser welded product comprising a laser transmissive part made with the composition has a bonding strength of about 19 MPa or at least 17 MPa.

In another embodiment, a composition of the invention comprises (1) an inorganic filler, at about 50 wt % in the overall composition, (2) a TCDDM-modified butylene terephthalate-type polyester, and (3) PBT, wherein the fraction derived from TCDDM is about 60 wt % (or between about 50 wt % and 70 wt %) in the TCDDM-modified butylene terephthalate-type polyester, and/or the TCDDM residual in the overall composition is about 10 wt % (or between about 5 wt % and 15 wt %), the compositions have a transmittance of about 12% (or between 10% and 15%) at a wavelength of 800 to 1200 nm in terms of a thickness of 1.5 mm at any locations (e.g., across a distance of at least 1 cm, 2 cm, 3 cm, 4 cm, or 5 cm) in a molded product comprising the composition, wherein at two locations having a difference of about 0.3% (or less than 0.5%) in transmittance, and a laser welded product comprising a laser transmissive part made with the composition has a bonding strength of about 21 MPa or at least 19 MPa.

In another embodiment, a composition of the invention comprises (1) an inorganic filler, (2) a TCDDM-modified butylene terephthalate-type polyester, and (3) PET, wherein the fraction derived from TCDDM is about 60 wt % (or between about 50 wt % and 70 wt %) in the TCDDM-modified butylene terephthalate-type polyester, and/or the TCDDM residual in the overall composition is about 10 wt % (or between about 5 wt % and 15 wt %), the compositions have a transmittance of about 70% (or at least 65%) at a wavelength of 800 to 1200 nm in terms of a thickness of 1.5 mm at any locations (e.g., across a distance of at least 1 cm, 2 cm, 3 cm, 4 cm, or 5 cm) in a molded product comprising the composition, wherein at two locations having a difference of about 4.5% (or less than 5%) in transmittance, and a laser welded product comprising a laser transmissive part made with the composition has a bonding strength of about 14 MPa or at least 12 MPa.

Further preferable embodiments provide a molded product comprising the composition of the invention has a welding strength or bonding strength of at least 19 MPa, that is, a tensile strength of at least 19 MPa is required to break apart the molded product at the welding interface or seam. This is stronger compared to a molded product prepared from comparative example compositions (e.g., shown as C1-C4 in table 1) which do not include the TCDDM-modified polyester or which do not contain TCDDM or residual of TCDDM in the compositions, wherein the molded product has a bonding strength of less than 19 MPa.

The compositions of the invention have various utilities, for instance in the form of a resin, as mechanical parts (e.g., cover of motor, housing for electric tool, impeller for pump, parts for motorcar), electric or electronic parts (e.g., connector, parts of hair dryer, flexible printed circuit, parts of color television, etc.), as helmets, baths, containers for drugs and foodstuffs, parts of cigarette lighters, or the like; or as a radar sensor.

Test Methods

In the description above and in the examples that follow, the following test methods were employed to determine various reported characteristics and properties. ASTM refers to the American Society for Testing and Materials, ISO stands for the International Organization for Standardization, and CNS refers to the National Standards of the Republic of China.

Intrinsic Viscosity (IV) is a measure of the inherent resistance to flow for a polymer solution and was determined by ASTM D2857, which is hereby incorporated by reference, and is reported in dL/g. The solvent and temperature used to study the IV of the presently disclosed polyester (e.g., PBT) in a glass capillary viscometer was o-chlorophenol at a polymer concentration of 1 g/dL (or 0.2 g polyester/ 20 mL solvent) at 35° C.

Carboxylic end group (CEG) content, also referred to as CEG concentration, was measured by titration. A solution of the polyester dissolved in o-cresol, including potassium chloride (KCl) at a concentration of 0.01 M in the solution, was titrated with ethanolic potassium hydroxide solution (potassium hydroxide concentration at 0.05 M).

Strength, or grab tensile strength, is a measure of the breaking strength of a sheet of fibers and was determined by ASTM D5034 standard which is hereby incorporated by reference, and is reported in Newtons or in kilogram•force. On earth's surface, 1 kgf is about 9.8 N. The bonding strength, or welding strength, of welded products comprising the compositions disclosed herein is measured with INSTRON universal testing system 3366, where tensile (pulling) force was applied at two ends—one end secured to the substrate for the laser transmissive part and the other end secured to the substrate for the laser absorbing part. The testing condition was accordingly to international standard ISO 527.

It should be understood within the scope of the present disclosure, the above-mentioned technical features and technical features mentioned below (such as examples) can be combined freely and mutually to form new or preferred technical solutions, which are omitted for brevity.

EXAMPLES

The following examples are not intended to limit the scope of the claims to the invention, but are rather intended to be exemplary of certain embodiments. Any variations in the exemplified processes which occur to the skilled artisan are intended to fall within the scope of the invention.

Example 1: Sample 1 ("S1")

Step 1: prepare TCDDM-modified polyester. 900 g of PTA (molecular weight 166 g/mol; 5.42 moles, limiting reagent), 610 g of BDO (molecular weight 90.12 g/mol; 6.77 moles), and 267 g of TCDDM (molecular weight 196.28 g/mol; 1.36 moles) were placed in a reactor and heated to 200-230° C. in the presence of a titanium-based catalyst, while being stirred slowly under a nitrogen atmosphere. When collected at 95% theoretical water, the esterification was considered completed. Then the pressure was reduced to 0.1 mmHg and maintained at <0.1 mmHg at 240-250° C. Excess amount of BDO (boiling point 230° C.) was removed at this elevated temperature by applying low vacuum to reduce the pressure in the reactor. The intrinsic viscosity of polyester is controlled at 0.7 dL/g (or about 0.7-0.8 dL/g) by torque of the stirrer, whereby a TCDDM-derived polyester ("B-1") was obtained (containing 19.96 wt % TCDDM residual). TCDDM-derived polyester B-1 had an intrinsic viscosity between 0.7 dL/g and 0.8 dL/g, a glass transition temperature (Tg) of 54±2° C., and a melting temperature (Tm) of 170±5° C.

Step 2: incorporation of TCDDM-modified polyester B-1 and preparation of polyester resin sample 1 ("S1"). Glass fiber at 30 wt % of the final composition, TCDDM-derived polyester B-1 at 16 wt % of the final composition, PBT resin at 53.6 wt % of the final composition, an antioxidant at 0.2 wt % of the final composition, and a lubricant at 0.2 wt % of the final composition were placed in a mixing apparatus, such as a screw extruder, BRABENDER® mixer, or a BANBURY® mixer. The extrudate was cooled and pelleted. Alternatively, individual components could be premixed to form pellets, then the remaining components were individually added and/or after they were likewise mixed. The mixing temperatures were generally from 230° C. to 290° C.

Hence, the content of TCDDM residual in the final resin composition S1 was 19.96 wt %×0.16=3.19 wt %.

Example 2: Sample 2 ("S2")

Step 1: prepare TCDDM-modified polyester. 900 g of PTA (5.42 moles, limiting reagent), 682.5 g of BDO (7.57 moles), and 106.8 g of TCDDM (0.54 moles) were placed in a reactor and heated to 200-230° C. in the presence of a titanium-based catalyst, while being stirred slowly under a nitrogen atmosphere. When collected at 95% theoretical water, the esterification was considered completed. Then the pressure was reduced to 0.1 mmHg and maintained at <0.1 mmHg at 240-250° C. Excess amount of BDO (boiling point 230° C.) was removed at this elevated temperature by applying low vacuum to reduce the pressure in the reactor. The intrinsic viscosity of polyester is controlled at 0.7 dL/g (or about 0.7-0.8 dL/g) by torque of the stirrer, whereby a TCDDM-derived polyester ("B-2", containing 8.53 wt % TCDDM residual) was obtained.

Step 2: incorporation of TCDDM-modified polyester B-2 and preparation of polyester resin sample 2 ("S2"). Glass fiber at 30 wt % of the final composition, TCDDM-derived polyester B-2 at 16 wt % of the final composition, PBT resin at 53.6 wt % of the final composition, an antioxidant at 0.2 wt % of the final composition, and a lubricant at 0.2 wt % of the final composition were placed in a mixing apparatus, such as a screw extruder, BRABENDER® mixer, or a BANBURY® mixer. The extrudate was cooled and pelleted. Alternatively, individual components could be premixed to form pellets, then the remaining components were individually added and/or after they were likewise mixed. The mixing temperatures were generally from 230° C. to 290° C.

Hence, the content of TCDDM residual in the final resin composition S2 was 8.53 wt %×0.16=1.36 wt %.

Example 3: Sample 3 ("S3")

Step 1: prepare TCDDM-modified polyester. 900 g of PTA (5.42 moles, limiting reagent), 490 g of BDO (5.44 moles), and 534 g of TCDDM (2.72 moles) were placed in a reactor and heated to 200-230° C. in the presence of a titanium-based catalyst, while being stirred slowly under a nitrogen atmosphere. When collected at 95% theoretical water, the esterification was considered completed. Then the pressure was reduced to 0.1 mmHg and maintained at <0.1 mmHg at 240-250° C. Excess amount of BDO (boiling point 230° C.) was removed at this elevated temperature by applying low vacuum to reduce the pressure in the reactor. The intrinsic viscosity of polyester is controlled at 0.7 dL/g (or about 0.7-0.8 dL/g) by torque of the stirrer, whereby a TCDDM-derived polyester ("B-3", containing 36.03 wt % TCDDM residual) was obtained.

Step 2: incorporation of TCDDM-modified polyester B-3 and preparation of polyester resin sample 3 ("S3"). Glass fiber at 30 wt % of the final composition, TCDDM-derived polyester B-3 at 16 wt % of the final composition, PBT resin at 53.6 wt % of the final composition, an antioxidant at 0.2 wt % of the final composition, and a lubricant at 0.2 wt % of the final composition were placed in a mixing apparatus, such as a screw extruder, BRABENDER® mixer, or a BANBURY® mixer. The extrudate was cooled and pelleted. Alternatively, individual components could be premixed to form pellets, then the remaining components were individually added and/or after they were likewise mixed. The mixing temperatures were generally from 230° C. to 290° C.

Hence, the content of TCDDM residual in the final resin composition S3 was 36.03 wt %×0.16=5.76 wt %.

Example 4: Sample 4 ("S4")

Step 1: prepare TCDDM-modified polyester. 900 g of PTA (5.42 moles, limiting reagent) and 1063 g of TCDDM (5.42 moles) were placed in a reactor and heated to 200-230° C. in the presence of a titanium-based catalyst, while being stirred slowly under a nitrogen atmosphere. When collected at 95% theoretical water, the esterification was considered completed. Then the pressure was reduced to 0.1 mmHg and maintained at <0.1 mmHg at 240-250° C. The intrinsic viscosity of polyester is controlled at 0.7 dL/g (or about 0.7-0.8 dL/g) by torque of the stirrer, whereby a TCDDM-derived polyester ("B-4", containing 60.13 wt % TCDDM residual) was obtained.

Step 2: incorporation of TCDDM-modified polyester B-4 and preparation of polyester resin sample 4 ("S4"). Glass fiber at 30 wt % of the final composition, TCDDM-derived polyester B-4 at 16 wt % of the final composition, PBT resin at 53.6 wt % of the final composition, an antioxidant at 0.2 wt % of the final composition, and a lubricant at 0.2 wt % of the final composition were placed in a mixing apparatus, such as a screw extruder, BRABENDER® mixer, or a BANBURY® mixer. The extrudate was cooled and pelleted. Alternatively, individual components could be premixed to form pellets, then the remaining components were individually added and/or after they were likewise mixed. The mixing temperatures were generally from 230° C. to 290° C.

Hence, the content of TCDDM residual in the final resin composition S4 was 60.13 wt %×0.16=9.62 wt %.

Example 5: Sample 5 ("S5")

Incorporation of TCDDM-modified polyester B-4 (of Example 4) and preparation of polyester resin sample 5 ("S5"). Glass fiber at 30 wt % of the final composition, TCDDM-derived polyester B-4 at 30 wt % of the final composition, PBT resin at 39.6 wt % of the final composition, an antioxidant at 0.2 wt % of the final composition, and a lubricant at 0.2 wt % of the final composition were placed in a mixing apparatus, such as a screw extruder, BRABENDER® mixer, or a BANBURY® mixer. The extrudate was cooled and pelleted.

Hence, the content of TCDDM residual in the final resin composition S5 was 60.13 wt %×0.30=18.04 wt %.

Example 6: Sample 6 ("S6")

Incorporation of TCDDM-modified polyester B-4 (of Example 4) and preparation of polyester resin sample 6 ("S6"). Glass fiber at 30 wt % of the final composition, TCDDM-derived polyester B-4 at 50 wt % of the final composition, PBT resin at 19.6 wt % of the final composition, an antioxidant at 0.2 wt % of the final composition, and a lubricant at 0.2 wt % of the final composition were placed in a mixing apparatus, such as a screw extruder, BRABENDER® mixer, or a BANBURY® mixer. The extrudate was cooled and pelleted.

Hence, the content of TCDDM residual in the final resin composition S6 was 60.13 wt %×0.50=30.07 wt %.

Example 7: Sample 7 ("S7")

Incorporation of TCDDM-modified polyester B-1 (of Example 1) and preparation of polyester resin sample 7 ("S7"). Glass fiber at 30 wt % of the final composition, TCDDM-derived polyester B-1 at 30 wt % of the final composition, PBT resin at 39.6 wt % of the final composition, an antioxidant at 0.2 wt % of the final composition, and a lubricant at 0.2 wt % of the final composition were placed in a mixing apparatus, such as a screw extruder, BRABENDER® mixer, or a BANBURY® mixer. The extrudate was cooled and pelleted.

Hence, the content of TCDDM residual in the final resin composition S7 was 19.96 wt %×0.30=5.99 wt %.

Example 8: Sample 8 ("S8")

Incorporation of TCDDM-modified polyester B-4 (of Example 4) and preparation of polyester resin sample 8 ("S8"). Glass fiber at 10 wt % of the final composition, TCDDM-derived polyester B-4 at 16 wt % of the final composition, PBT resin at 73.6 wt % of the final composition, an antioxidant at 0.2 wt % of the final composition, and a lubricant at 0.2 wt % of the final composition were placed in a mixing apparatus, such as a screw extruder, BRABENDER® mixer, or a BANBURY® mixer. The extrudate was cooled and pelleted.

Hence, the content of TCDDM residual in the final resin composition S8 was 60.13 wt %×0.16=9.62 wt %.

Example 9: Sample 9 ("S9")

Incorporation of TCDDM-modified polyester B-4 (of Example 4) and preparation of polyester resin sample 9 ("S9"). Glass fiber at 50 wt % of the final composition, TCDDM-derived polyester B-4 at 16 wt % of the final composition, PBT resin at 33.6 wt % of the final composition, an antioxidant at 0.2 wt % of the final composition, and a lubricant at 0.2 wt % of the final composition were placed in a mixing apparatus, such as a screw extruder, BRABENDER® mixer, or a BANBURY® mixer. The extrudate was cooled and pelleted.

Hence, the content of TCDDM residual in the final resin composition S9 was 60.13 wt %×0.16=9.62 wt %.

Example 10: Sample 10 ("S10")

Incorporation of TCDDM-modified polyester B-4 (of Example 4) and preparation of polyester resin sample 10 ("S10"). Glass fiber at 30 wt % of the final composition, TCDDM-derived polyester B-4 at 16 wt % of the final composition, PET resin at 53.6 wt % of the final composition, an antioxidant at 0.2 wt % of the final composition, and a lubricant at 0.2 wt % of the final composition were placed in a mixing apparatus, such as a screw extruder, BRABENDER® mixer, or a BANBURY® mixer. The extrudate was cooled and pelleted.

Hence, the content of TCDDM residual in the final resin composition S10 was 60.13 wt %×0.16=9.62 wt %.

Example 11: Comparative Example 1 ("C1")

Preparation of comparative polyester resin ("C1") which lacks TCDDM-modified polyester. Glass fiber at 30 wt % of the final composition, PBT resin at 53.6 wt % of the final composition, polycarbonate at 16 wt % of the final composition, an antioxidant at 0.2 wt % of the final composition, and a lubricant at 0.2 wt % of the final composition were placed in a mixing apparatus, such as a screw extruder, BRABENDER® mixer, or a BANBURY® mixer. The extrudate was cooled and pelleted.

FIG. 1 shows that a blend containing primarily PBT, polycarbonate and glass fiber, but without TCDDM or TCDDM-modified polyester, i.e., C1, exhibits apparent phase separation under microscopy. This is indicative of the non-uniformity of micro-structure, and thereby non-uniform optical properties of C1.

Example 12: Comparative Example 2 ("C2")

Preparation of comparative polyester resin ("C2") which lacks TCDDM-modified polyester. Glass fiber at 30 wt % of the final composition, PBT resin at 69.1 wt % of the final composition, an antioxidant at 0.2 wt % of the final composition, a lubricant at 0.2 wt % of the final composition, and $Na_2CO_3$ at 0.5 wt % of the final composition were placed in a mixing apparatus, such as a screw extruder, BRABENDER® mixer, or a BANBURY® mixer. The extrudate was cooled and pelleted.

Example 13: Comparative Example 3 ("C3")

Preparation of comparative polyester resin ("C3") which lacks TCDDM-modified polyester. Glass fiber at 30 wt % of the final composition, PBT resin at 69.6 wt % of the final composition, an antioxidant at 0.2 wt % of the final composition, and a lubricant at 0.2 wt % of the final composition were placed in a mixing apparatus, such as a screw extruder, BRABENDER® mixer, or a BANBURY® mixer. The extrudate was cooled and pelleted.

Example 14: Comparative Example 4 ("C4")

Preparation of comparative polyester resin ("C4") which lacks TCDDM-modified polyester. Glass fiber at 30 wt % of the final composition, PET resin at 69.6 wt % of the final composition, an antioxidant at 0.2 wt % of the final composition, and a lubricant at 0.2 wt % of the final composition were placed in a mixing apparatus, such as a screw extruder, BRABENDER® mixer, or a BANBURY® mixer. The extrudate was cooled and pelleted.

Bonding Strength and Transmittance Analysis

Figure 2:
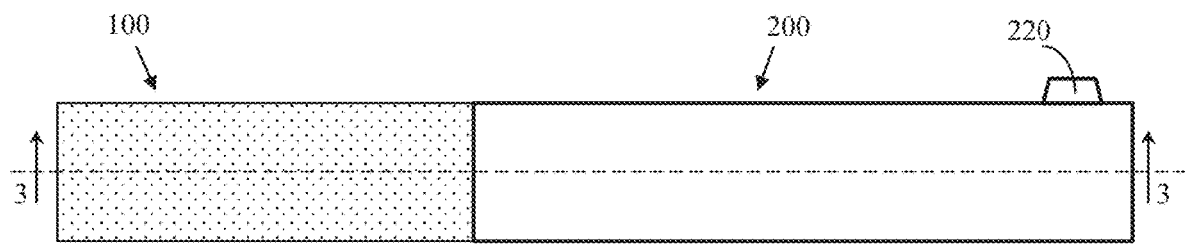
FIG. 2 and FIG. 3 are a plan view (from the top) and a sectional view (from the side), respectively, of a laser welded assembly having a laser absorbing joining part 100 on the left and a laser transmissive part 200 made with the composition disclosed herein on the right. The plane upon which the sectional view (FIG. 3) is taken is indicated on the plan view (FIG. 2) in the direction of arrows 3 from which the section is cut by a broken line. A welding seam 210 is left at the interface between the laser transmissive part 200 and the laser absorbing joining part 100. At a corner of the laser transmissive part 200 is the injection gate 220 for injecting melted composition into the mold. Separated by the welding seam 210, a location 230 closer to the injection gate 220 is considered an initial position for testing the transmittance, "Ti"; and a location 240 farther away from the injection gate 220 is considered an ending position for testing the transmittance, "Te". The laser welded assembly will be tested for its welding strength in a universal testing machine (e.g., INSTRON 3366) by being pulled at one end of the laser absorbing joining part 100 and at another end of the laser transmissive part 200 in opposite directions.
Figure 3:
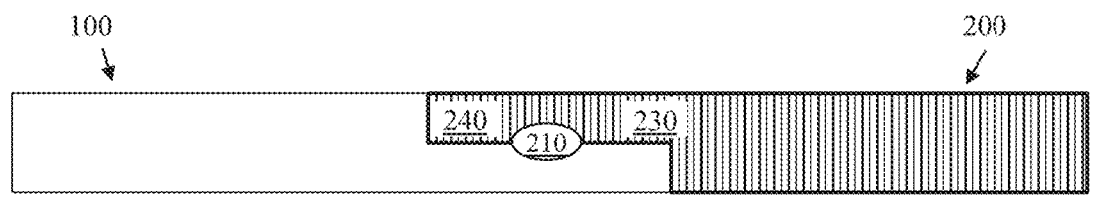

INSTRON universal testing system 3366 was utilized to measure the bonding strength (or welding strength) of a laser welded assembly between each of the laser weldable compositions disclosed above and a laser absorbing joining part. INSTRON 3366 model has a force capacity of 10 kN (2,250 lbf), a maximum tensile speed at 500 mm/min, a vertical test space of 1193 mm and is equipped with a thermal cycle chamber. FIG. 2 and FIG. 3 demonstrate that a thin part (about 1.5 mm in thickness) of laser transmissive part 200 was placed in contact with a laser absorbing joining part 100, and the laser transmissive part 200 and the laser absorbing joining part 100 were laser welded to join together, leaving a seam 210 at the interface. The welded product was assayed with INSTRON 3366 in a tensile test, where tensile (pulling) force was applied at two ends—one end secured to the substrate for the laser transmissive part and the other end secured to the substrate for the laser absorbing part. The testing condition was accordingly to international standard ISO 527.

To measure the uniformity of laser beam transmittance, therefore microscopic uniformity in structure of the composition, LPKF TMG3 transmission tester was utilized to measure laser beam transmittance at various locations of each of compositions S1-S10 and comparative examples C1-C4, at a laser wavelength of 980 nm at a maximum laser power of 1 mW and a laser beam focus diameter of 1.2 mm. The LPKF TMG 3 transmission tester determines the amount of laser radiation transmitted through a sample of plastic pursuant to DVS Regulation 2243. The beam intensity measured without a sample in the beam path was set as 100% transmittance. A laser beam was then sent through the sample and its intensity was determined where the beam exits the sample. The laser transmittance (T %) though a molded product prepared with any of the compositions disclosed herein was tested at least at two locations of the molded product. The difference between the two transmittance levels at two locations (or the difference between a highest and a lowest transmittance level if more than two locations were tested) was calculated as the laser transmittance deviation (T % deviation). FIG. 3 depicts two spots 230 and 240 of a laser transmissive part for measurement of laser beam transmittance.

Table 1 compares the bonding strengths and transmittance deviation of laser weldable compositions prepared with different content (S1-S10 and C1-C4).

For example, S10 and C4 are both PET-based compositions, but differ in the amount of TCDDM-derived polyester, wherein S10 has 16 wt % TCDDM-derived polyester B-4 and 53.6 wt % PET polyester in the composition whereas C4 does not have any TCDDM-derived polyester and all of its polyester is PET (taking up 69.6 wt %). The introduction of a comonomer that results in TCDDM residual to the polyester composition led to an improved bonding strength (14.73 MPa vs. 13.33 MPa) and a smaller laser transmittance deviation (4.5 vs. 6.2), thereby a more uniform microstructure and overall optical consistency.

Further, compared with compositions without the TCDDM copolymer (C1-C3), the compositions of S1-S9 have improved, uniform laser transmittance and bonding strength, thereby welded products including the compositions require stronger tensile strength to be torn apart.

TABLE 1

Formula, analysis and measurements of ten sample compositions (S1-S10) and four comparative examples (C1-C4).

| Formula of Compositions | | S1 | S2 | S3 | S4 | S5 | S6 | S7 |
|---|---|---|---|---|---|---|---|---|
| (A) Glass fiber (wt %) | | 30 | 30 | 30 | 30 | 30 | 30 | 30 |
| (B-1) polyester containing 19.96 wt % TCDDM residual | | 16 | | | | | | 30 |
| (B-2) polyester containing 8.53 wt % TCDDM residual | | | 16 | | | | | |
| (B-3) polyester containing 36.03 wt % TCDDM residual | | | | 16 | | | | |
| (B-4) polyester containing 60.13 wt % TCDDM residual | | | | | 16 | 30 | 50 | |
| (C-1) PBT resin (wt %) | | 53.6 | 53.6 | 53.6 | 53.6 | 39.6 | 19.6 | 39.6 |
| (C-2) PET resin (wt %) | | | | | | | | |
| Polycarbonate (wt %) | | | | | | | | |
| Anti-Oxidant (wt %) | | 0.2 | 0.2 | 0.2 | 0.2 | 0.2 | 0.2 | 0.2 |
| Lubricant (wt %) | | 0.2 | 0.2 | 0.2 | 0.2 | 0.2 | 0.2 | 0.2 |
| $Na_2CO_3$ (wt %) | | | | | | | | |
| Content of TCDDM residual in final composition (wt %) | | 3.19 | 1.36 | 5.76 | 9.62 | 18.04 | 30.07 | 5.99 |
| Measurement & Test result | Bonding Strength (MPa) | 21.7 | 20.84 | 23.01 | 19.23 | 20.65 | 18.89 | 22.8 |
| | $T_i$ % at 1.5 mm | 14.90% | 12.00% | 14.40% | 11.80% | 12.80% | 38.10% | 23.40% |
| | $T_e$ % at 1.5 mm | 18.20% | 12.30% | 16.90% | 11.30% | 12.90% | 37.80% | 34.90% |
| | T % Deviation $T_i - T_e$ | 3.3 | 0.3 | 2.5 | 0.5 | 0.1 | 0.3 | 11.5 |

TABLE 1-continued

Formula, analysis and measurements of ten sample compositions (S1-S10) and four comparative examples (C1-C4).

| Formula of Compositions | | S8 | S9 | S10 | C1 | C2 | C3 | C4 |
|---|---|---|---|---|---|---|---|---|
| (A) Glass fiber (wt %) | | 10 | 50 | 30 | 30 | 30 | 30 | 30 |
| (B-1) polyester containing 19.96 wt % TCDDM residual | | | | | | | | |
| (B-2) polyester containing 8.53 wt % TCDDM residual | | | | | | | | |
| (B-3) polyester containing 36.03 wt % TCDDM residual | | | | | | | | |
| (B-4) polyester containing 60.13 wt % TCDDM residual | | 16 | 16 | 16 | | | | |
| (C-1) PBT resin (wt %) | | 73.6 | 33.6 | | 53.6 | 69.1 | 69.6 | |
| (C-2) PET resin (wt %) | | | | 53.6 | | | | 69.6 |
| Polycarbonate (wt %) | | | | | 16 | | | |
| Anti-Oxidant (wt %) | | 0.2 | 0.2 | 0.2 | 0.2 | 0.2 | 0.2 | 0.2 |
| Lubricant (wt %) | | 0.2 | 0.2 | 0.2 | 0.2 | 0.2 | 0.2 | 0.2 |
| Na$_2$CO$_3$ (wt %) | | | | | | 0.5 | | |
| Content of TCDDM residual in final composition (wt %) | | 9.62 | 9.62 | 9.62 | 0 | 0 | 0 | 0 |
| Measurement & Test result | Bonding Strength (MPa) | 19.42 | 21.34 | 14.73 | 18.94 | 17.65 | 2.59 | 13.33 |
| | T$_i$ % at 1.5 mm | 12.50% | 12.60% | 73.50% | 23.60% | 46.70% | 10.30% | 70.60% |
| | T$_e$ % at 1.5 mm | 12.30% | 12.90% | 69.00% | 55.60% | 40.60% | 11.00% | 64.40% |
| | T % Deviation T$_i$ − T$_e$ | 0.2 | 0.3 | 4.5 | 32 | 6.1 | 0.7 | 6.2 |

The foregoing description of various embodiments of the invention known to the applicant at this time of filing the application has been presented and is intended for the purposes of illustration and description. The present description is not intended to be exhaustive nor limit the invention to the precise form disclosed and many modifications and variations are possible in the light of the above teachings. The embodiments described serve to explain the principles of the invention and its practical application and to enable others skilled in the art to utilize the invention in various embodiments and with various modifications as are suited to the particular use contemplated. Therefore, it is intended that the invention not be limited to the particular embodiments disclosed for carrying out the invention.

As used herein the term "comprising" or "comprises" is used in reference to compositions, methods, and respective component(s) thereof, that are useful to an embodiment, yet open to the inclusion of unspecified elements, whether useful or not. It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). Although the open-ended term "comprising," as a synonym of terms such as including, containing, or having, is used herein to describe and claim the invention, the present invention, or embodiments thereof, may alternatively be described using alternative terms such as "consisting of" or "consisting essentially of."

Unless otherwise indicated, all numbers expressing quantities should be understood as modified in all instances by the term "about." The term "about" when may mean±5% (e.g., ±4%, ±3%, ±2%, ±1%) of the value being referred to.

Where a range of values is provided, each numerical value between and including the upper and lower limits of the range is contemplated as disclosed herein. It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values.

What is claimed is:

1. A composition, comprising:
   a. an inorganic filler,
   b. a copolymer derived from monomers consisting of monomers represented by formulae (I), (II) and (III):

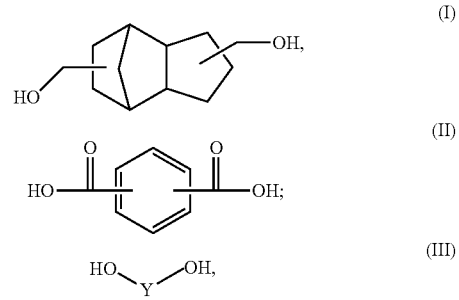

(III), wherein Y is an aliphatic hydrocarbon group having 2 to 6 carbon atoms,
and
   c. a polyester,
   wherein the fraction derived from the monomer represented by formula (I) of the copolymer is between 1% and 70% in weight relative to the weight of the composition; the inorganic filler is present in an amount in the range of 0.1 to 60 wt. % relative to the weight of the composition;
   and wherein the polyester comprises polybutylene terephthalate as a condensation product of 1,4-butanediol and 1,4-benzenedicarboxylic acid.

2. The composition of claim 1, wherein the polyester further comprises at least one selected from the group consisting of polybutylene isophthalate, polyethylene terephthalate, polyethylene isophthalate, polytrimethylene terephthalate, polytrimethylene isophthalate, and a thermoplastic polyether-ester elastomer.

3. The composition of claim 1, wherein the inorganic filler is selected from the group consisting of glass fiber, quartz, amorphous silica, colloidal silica, ceramics, zirconia, and a combination thereof.

4. The composition of claim 1, wherein the monomer represented by formula (III) is selected from the group consisting of ethylene glycol, propylene glycol, 1,4-butanediol, 1,3-butanediol, 2-methyl-1,3-propanediol, pentylene glycol, and a combination thereof.

5. The composition of claim 1, wherein the molar ratio of the monomer represented by formula (I) to the monomer represented by formula (III) is between 99:1 and 1:99 in forming the copolymer.

6. The composition of claim 1, further comprising an additive.

7. The composition of claim 6, wherein the additive is selected from the group consisting of an antioxidant, a lubricant, and a combination thereof.

8. The composition of claim 1, wherein the copolymer has an intrinsic viscosity, determined by ASTM D2857, utilizing Ortho-chlorophenyl (OCP) as the solvent, at 35° C., in the range between 0.6 and 0.9 dL/g.

9. The composition of claim 1, wherein the fraction derived from the monomer represented by formula (I) of the copolymer is between 1% and 50% in weight relative to the composition.

10. The composition of claim 1, wherein the inorganic filler is present in an amount in the range of 10-60 wt. % relative to the weight of the composition.

11. The composition of claim 1, wherein the inorganic filler is present in an amount in the range of 30-60 wt. % relative to the weight of the composition.

12. The composition of claim 1, wherein the polyester consists of polybutylene terephthalate (PBT).

13. The composition of claim 1, which is configured for use in laser welding.

14. A light-transmittable resin, comprising the composition of claim 1.

15. A molded product, comprising the composition of claim 1.

16. The molded product of claim 15, comprising two molded parts bonded to each other by laser welding, at least one molded part comprising the composition of claim 1, wherein the molded product has a welding strength of 14 MPa or greater.

17. The molded product of claim 15, having an average laser light transmittance (LLT) at 980 nm of about 10% or greater for a thickness of about 1.5 mm, wherein a difference in laser light transmittance at two or more positions of the molded product for a thickness of about 1.5 mm is less than 12%.

18. A radar sensor, comprising the composition of claim 1.

* * * * *